United States Patent
Min et al.

(10) Patent No.: US 12,418,700 B2
(45) Date of Patent: Sep. 16, 2025

(54) ELECTRONIC DEVICE FOR PROVIDING CONTENT RECOMMENDATION SERVICE, AND METHOD THEREFOR

(71) Applicant: SAMSUNG ELECTRONICS CO., LTD., Suwon-si (KR)

(72) Inventors: Hwangki Min, Suwon-si (KR); Sungmin Rhee, Suwon-si (KR); Yuwon Lee, Suwon-si (KR); Donggeon Kim, Suwon-si (KR); Seungyeol Yoo, Suwon-si (KR); Seokho Yoon, Suwon-si (KR); Junyeop Lee, Suwon-si (KR); Chungki Lee, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/191,470

(22) Filed: Mar. 28, 2023

(65) Prior Publication Data
US 2023/0232075 A1    Jul. 20, 2023

Related U.S. Application Data

(63) Continuation of application No. PCT/KR2021/013172, filed on Sep. 28, 2021.

(30) Foreign Application Priority Data

Sep. 29, 2020    (KR) .......................... 10-2020-0127052

(51) Int. Cl.
*G06F 16/00*    (2019.01)
*G06F 16/3332*    (2025.01)
(Continued)

(52) U.S. Cl.
CPC ..... *H04N 21/4668* (2013.01); *G06F 16/3334* (2019.01); *G06F 16/48* (2019.01); *G06F 16/78* (2019.01); *H04N 21/25841* (2013.01)

(58) Field of Classification Search
None
See application file for complete search history.

(56) References Cited

U.S. PATENT DOCUMENTS 7,840,565 B2 * 11/2010 Kutsumi ............... G06F 40/242
                                                           707/730
8,909,651 B2 * 12/2014 Park ........................ G06Q 10/10
                                                           705/7.29

(Continued)

FOREIGN PATENT DOCUMENTS

JP      2016091221 A      5/2016
JP      2016139229 A      8/2016
(Continued)

OTHER PUBLICATIONS

Korean Office Action dated Sep. 10, 2024 for KR Application No. 10-2020-0127052.

*Primary Examiner* — Bai D Vu
(74) *Attorney, Agent, or Firm* — Nixon & Vanderhye P.C.

(57) ABSTRACT

An electronic device may include a wireless communication circuit, a memory, and a processor. The memory may store instructions that allow, when executed, the processor to: obtain context information associated with the state of the electronic device, and contents information being provided by the electronic device; extracting first keywords on the basis of the context information and the contents information; analyze the keyword level for the first keywords; changing the first keywords into a superordinate concept according to preset keyword levels to obtain second keywords; and transmit the second keywords to at least one server by using the wireless communication circuit. Other (Continued)

various embodiments identified through the specification are possible.

20 Claims, 7 Drawing Sheets

(51) Int. Cl.
*G06F 16/48* (2019.01)
*G06F 16/78* (2019.01)
*H04N 21/258* (2011.01)
*H04N 21/466* (2011.01)

(56) References Cited

U.S. PATENT DOCUMENTS

| | | | |
|---|---|---|---|
| 9,317,834 | B2 | 4/2016 | Horvitz et al. |
| 9,557,972 | B2 | 1/2017 | Hur et al. |
| 9,569,726 | B2 | 2/2017 | Horvitz et al. |
| 9,602,472 | B2 | 3/2017 | Nandi et al. |
| 11,405,475 | B2 | 8/2022 | Bhagwan et al. |
| 2010/0161618 | A1* | 6/2010 | Kim .............. G06F 16/3331 707/748 |
| 2013/0006817 | A1 | 1/2013 | Weber et al. |
| 2014/0201675 | A1 | 7/2014 | Joo et al. |
| 2017/0032257 | A1 | 2/2017 | Sharifi et al. |
| 2020/0272678 | A1 | 8/2020 | Lee et al. |

FOREIGN PATENT DOCUMENTS

| | | |
|---|---|---|
| JP | 7042720 B2 | 3/2022 |
| KR | 20140027011 A | 3/2014 |
| KR | 20140091633 A | 7/2014 |
| KR | 20150111134 A | 10/2015 |
| KR | 101847370 B1 | 5/2018 |
| KR | 20180067424 A | 6/2018 |
| KR | 101984949 B1 | 6/2019 |
| KR | 20200104719 A | 9/2020 |

* cited by examiner

ELECTRONIC DEVICE FOR PROVIDING CONTENT RECOMMENDATION SERVICE, AND METHOD THEREFOR

CROSS-REFERENCE TO RELATED APPLICATIONS

This application is a continuation of International Application No. PCT/KR2021/013172, filed on Sep. 28, 2021, designating the United States, in the Korean Intellectual Property Receiving Office, and claiming priority to KR 10-2020-0127052 filed on Sep. 29, 2020, the disclosures of which are all hereby incorporated by reference herein in their entireties.

BACKGROUND

Field

Various example embodiments relate to an electronic device for providing content recommendation service, and/or a method therefor.

Description of Related Art

Nowadays, a service for recommending contents highly related to a situation, in which a user's electronic device is employed, is spreading. The electronic device may recommend various contents based on the user's usage history (e.g., user data). For example, the contents may include news, movies, and/or music. To increase the accuracy of a content recommendation service, a method of selecting contents with high interest is being discussed.

The electronic device may use a recommendation model to provide the content recommendation service. The recommendation model may be installed in the electronic device or at least one server that communicates with the electronic device to provide the content recommendation service. The recommendation model may be trained based on machine learning techniques. According to an embodiment, the electronic device may input user information (e.g., user ID) and a related item (e.g., context information or contents information) to the recommendation model. The recommendation model may output a user's interest level for an item as a value within a specific range (e.g., 0 to 1). The electronic device may train the recommendation model by entering a huge amount of data to the recommendation model. As the training is repeated, the electronic device may recommend contents with high accuracy by using the recommendation model. For example, the contents with high accuracy may be understood as contents with a high degree of interest to users.

SUMMARY

For various reasons, a recommendation model for recommending contents may be installed in an electronic device or at least one server.

For example, when the recommendation model is mounted on the at least one server, the training and/or operation of the recommendation model may be performed by the at least one server. The electronic device may transmit user data to the at least one server to provide a content recommendation service, and the at least one server may train and/or operate the recommendation model based on the received data. In this case, personal data may be exposed during data transmission, which may cause security issues.

For another example, when the same recommendation model is loaded on both the electronic device and the at least one server, the electronic device may train the recommendation model mounted on the electronic device with personal data and then may transmit only model parameters, which are obtained as the training results, to the at least one server. The at least one server may train the recommendation model loaded in the at least one server based on the received model parameters. In this case, the personal data in the electronic device is not exposed, but a large amount of resources of the electronic device may be consumed for the training of the recommendation model, and a large amount of communication resources may be consumed in a process of exchanging training results.

In providing a content recommendation service, a recommendation model and a contents recommendation method that are capable of reducing the resource consumption of an electronic devices or communication while personal data is protected may be discussed.

According to an example embodiment, an electronic device may include a wireless communication circuit, a memory, and a processor comprising processing circuitry. The memory may store instructions that, when executed, cause the processor to obtain context information related to a state of the electronic device and contents information being provided by the electronic device, to extract first keywords based on the context information and the contents information, to analyze a keyword level for the first keywords, to obtain second keywords by converting the first keywords into upper concepts depending on a predetermined keyword level, and to transmit the second keywords to at least one server by using the wireless communication circuit.

According to an example embodiment, an operating method of an electronic device may include obtaining context information related to a state of the electronic device and contents information being provided by the electronic device, extracting first keywords based on the context information and the contents information, analyzing a keyword level for the first keywords, obtaining second keywords by converting the first keywords into upper concepts depending on a predetermined keyword level, and transmitting the second keywords to at least one server.

According to an example embodiment, a computer-readable recording medium storing at least one or more instructions, when executed by at least one processor, may cause the at least one processor to perform obtaining context information related to a state of the electronic device and contents information being provided by the electronic device, extracting first keywords based on the context information and the contents information, analyzing a keyword level for the first keywords, obtaining second keywords by converting the first keywords into upper concepts depending on a predetermined keyword level, and transmitting the second keywords to at least one server.

According to various example embodiments, an electronic device may convert user data into an upper concept depending on a predetermined keyword level and then may transmit the converted result to at least one server. Accordingly, the electronic device may protect personal information.

According to various example embodiments, the electronic device may increase the accuracy of contents recommendation by re-scoring recommendation contents received from the at least one server based on user data stored in the electronic device.

According to various example embodiments, because the training of the recommendation model is performed by the at least one server, the electronic device may efficiently manage the resources of the electronic device.

Besides, a variety of effects directly or indirectly understood through the specification may be provided.

BRIEF DESCRIPTION OF DRAWINGS

The above and other aspects, features, and advantages of certain example embodiments will be more apparent from the following detailed description, taken in conjunction with the accompanying drawings, in which.

With regard to description of drawings, the same or similar components will be marked by the same or similar reference signs.

DETAILED DESCRIPTION

Figure 1:
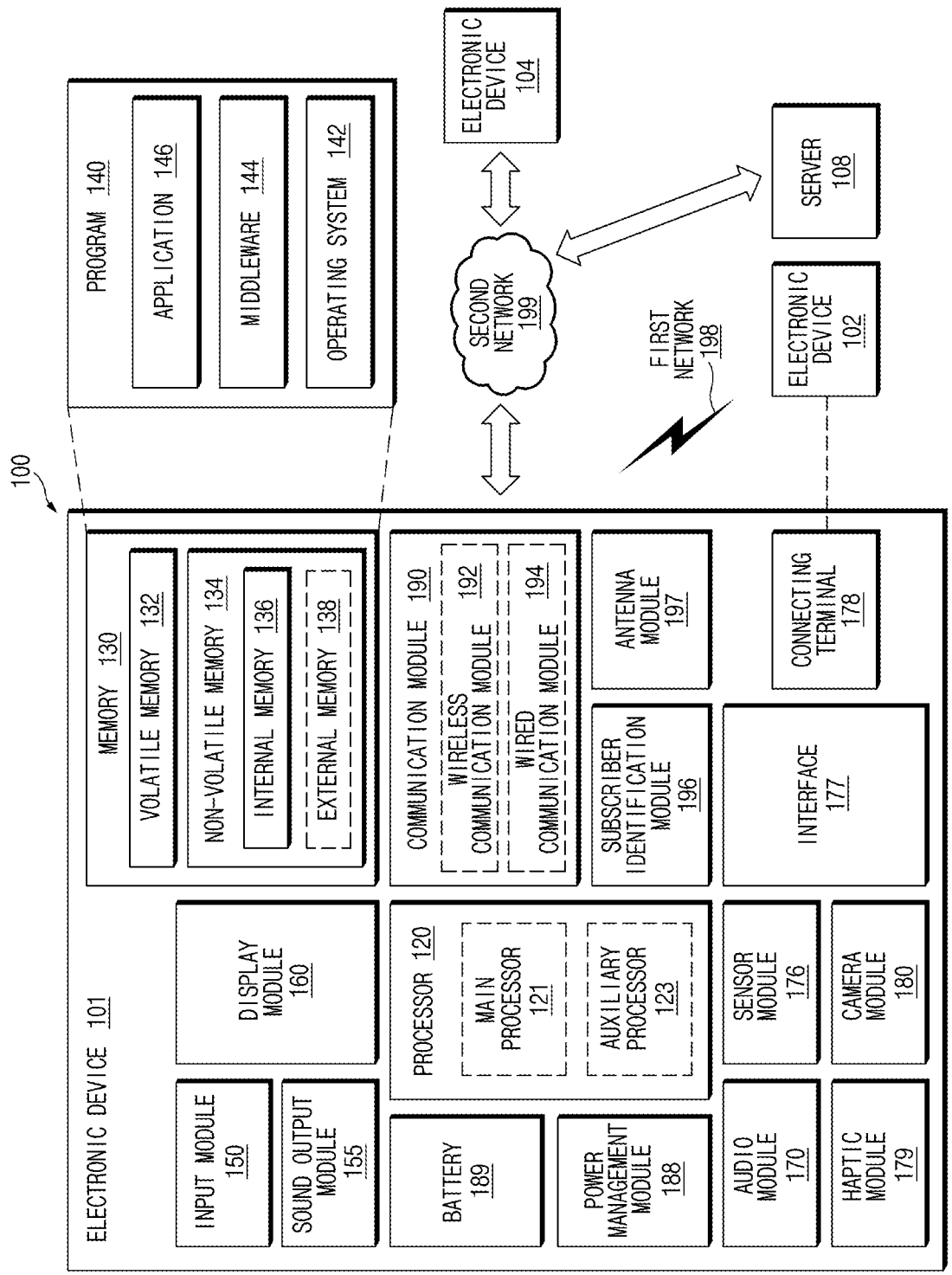
FIG. 1 is a block diagram of an electronic device in a network environment, according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
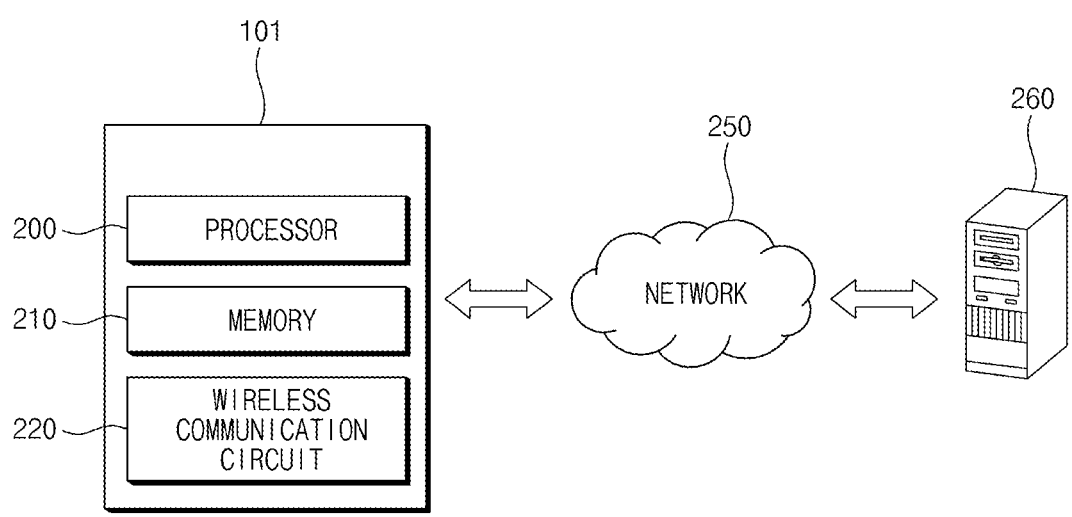
FIG. 2 is a block diagram illustrating a configuration of an electronic device, according to an example embodiment.

FIG. 2 is a block diagram illustrating a configuration of an electronic device, according to an embodiment.

According to an embodiment, an electronic device (e.g., the electronic device 101 of FIG. 1) may include a processor 200 (e.g., the processor 120 of FIG. 1), a memory 210 (e.g., the memory 130 of FIG. 1), and/or a wireless communication circuit 220 (e.g., the wireless communication module 192 of FIG. 1, comprising communication circuitry). A configuration of the electronic device 101 illustrated in FIG. 2 is only an example, and embodiments of the disclosure are not limited thereto. For example, the electronic device 101 may further include a battery (e.g., the battery 189 of FIG. 1).

For example, the processor 200 may execute software (e.g., the program 140 of FIG. 1) to control at least another component (e.g., a hardware or software component) of the electronic device 101 connected, directly or indirectly, to the processor 200, and may process and calculate various types of data.

The memory 210 may store various pieces of data used by the processor 200 of the electronic device 101. For example, data may include software (e.g., the program 140 of FIG. 1) and input data or output data for instructions associated with the software. For another example, data may include user data.

The wireless communication circuit 220 may establish a wireless communication channel between the electronic device 101 and an external electronic device (e.g., the electronic device 102, the electronic device 104, or the server 108 in FIG. 1) and may support the execution of wireless communication through the established wireless communication channel. The wireless communication circuit 220 may include one or more communication processors (e.g., the communication processor in FIG. 1) that operate independently of the processor 200 (e.g., the application processor in FIG. 1) and support wireless communication.

According to an embodiment, the processor 200 may communicate with at least one server 260 (e.g., the server 108 in FIG. 1) over a network 250 (e.g., the second network 199 in FIG. 1).

The at least one server 260 may include a recommendation model. The processor 200 may exchange data for recommending contents with the at least one server 260. For example, the processor 200 may obtain context information and/or contents information, may extract keywords based on the context information and/or the contents information, may convert the extracted keywords into an upper concept of a predetermined keyword level, and may transmit the converted result to the at least one server 260 by using the wireless communication circuit 220. The at least one server 260 may train the recommendation model based on data received from the electronic device 101. When there is a request for contents recommendation from the electronic device 101, the at least one server 260 may output and select recommendation contents from the recommendation model and then may transmit the recommendation contents to the electronic device 101. The processor 200 may re-score the received recommendation contents and then may determine final recommendation contents. For example, the processor 200 may provide the final recommendation contents through a display (e.g., the display module 160 in FIG. 1, comprising a display).

Figure 3:
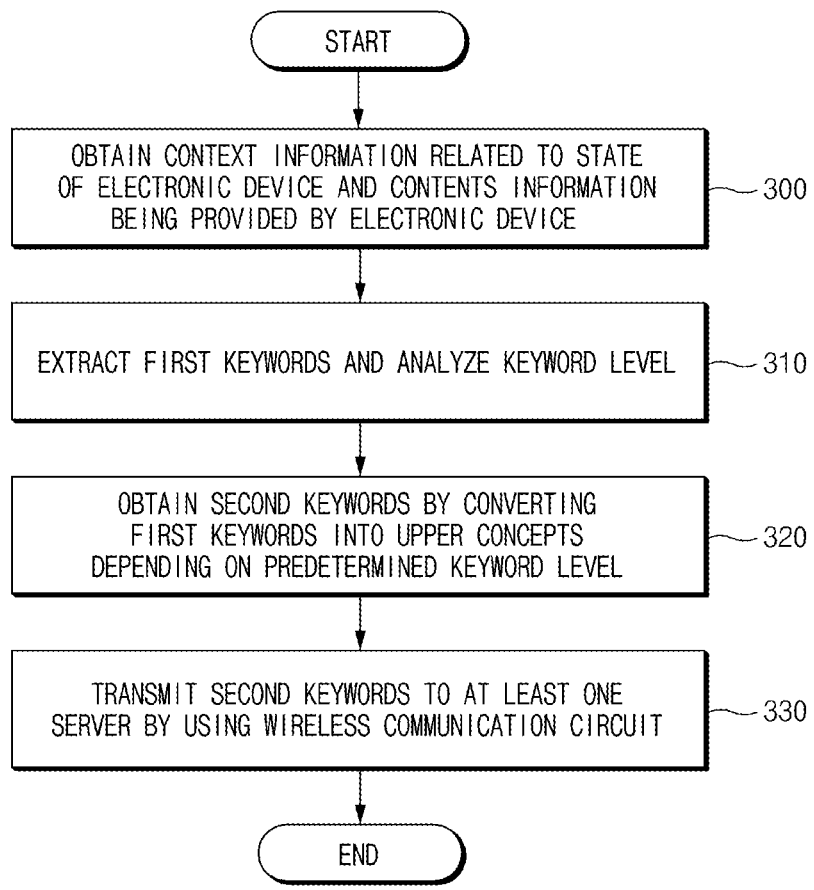
FIG. 3 is a flowchart illustrating an operation for training a recommendation model performed by an electronic device, according to an example embodiment.

FIG. 3 is a flowchart illustrating an operation for training a recommendation model performed by an electronic device, according to an embodiment.

Referring to operation 300, a processor (e.g., the processor 120 of FIG. 1 or the processor 200 of FIG. 2) may obtain context information related to a state of an electronic device (e.g., the electronic device 101 of FIG. 1 or 2) and contents information being provided by the electronic device 101. The context information and the contents information may be obtained while a user employs the electronic device 101. For example, the context information may include information about a user's situation such as whether the user of the electronic device 101 is going to work, leaving work, at home, at work, and/or sleeping. The contents information may be understood as information about contents provided to the user by the electronic device 101. For example, when the user is reading a news article by using the electronic device 101, the contents information may be understood as information about contents of the article.

In operation 310, the processor 200 may extract first keywords based on the context information and the contents information and may analyze a keyword level of first keywords. For example, the first keywords may be or include key words representing the context information and/or the contents information. For example, the processor 200 may hierarchically obtain upper concepts by analyzing categories of first keywords and then may classify the upper concepts of the first keywords depending on the keyword level. In the example below, although the keyword level is classified into three layers, this is an example. An embodiment of the disclosure is not limited thereto. For example, the processor 200 may obtain a subdivided upper concept for the first keywords. For example, when one of the first keywords is "Hyunjin Ryu", the processor 200 may analyze a category of "Hyunjin Ryu" and may obtain baseball and sports as the upper concept.

In operation 320, the processor 200 may obtain second keywords by converting the first keywords into upper concepts depending on a predetermined keyword level. The predetermined keyword level may be specified by the user. For example, assuming that the keyword level of the first keyword "Hyunjin Ryu" is set to level 1, a keyword level of baseball, which is higher than "Hyunjin Ryu" as much as one level, may refer to level 2, and a keyword level of sports, which is higher than baseball as much as one level, may refer to level 3. When the predetermined keyword level is level 2, the processor 200 may obtain baseball as a second keyword by converting the first keyword "Hyunjin Ryu" into an upper concept depending on a predetermined keyword level.

As described above, an operation of obtaining second keywords by converting first keywords into upper concepts depending on a predetermined keyword level may be referred to as "data abstraction".

In operation 330, the processor 200 may transmit the second keywords to the at least one server 260 by using a wireless communication circuit (e.g., the wireless communication circuit 220 in FIG. 2). The at least one server 260 may train a recommendation model by using the second keywords. The training of the recommendation model will be described with reference to FIG. 5. The second keywords are upper concepts of the first keywords, and thus the degree of exposure of personal information may decrease due to the exposure of second keywords at a point in time when the second keywords is transmitted to the at least one server 260. The degree of exposure of personal information varies depending on a keyword level set by each individual. As the predetermined keyword level is high, the personal information may be less exposed. The processor 200 may transmit a user ID to the at least one server 260 together with the second keywords. The user ID may be used to identify a user without including personal information.

TABLE 1

| Processor | First user | Second user |
|---|---|---|
| Obtaining context information and contents information | Reading news article "Hyunjin Ryu 20 wins" at attendance situation (Context additional information: Workplace - Samsung Electronics (Suwon City)) | Watching movie "The Avengers" at attendance situation (Context additional information: Workplace - Samsung Electronics (Suwon City)) |
| Extracting first keywords | Samsung Electronics Hyunjin Ryu achieved 20 wins | Samsung Electronics "The Avengers" |
| Analyzing keyword level | [level 0]-[level 1]-[level 2] Samsung Electronics - Suwon - Gyeonggi-do "Hyunjin Ryu" - baseball - sports | [level 0]-[level 1]-[level 2] Samsung Electronics - Suwon - Gyeonggi-do "The Avengers" - SF movie - movie |
| Storing user data | Storage | Storage |
| Conversion to upper concept depending on | Predetermined keyword level: level 2 Samsung Electronics → | Predetermined keyword level: level 3 Samsung Electronics → |

TABLE 1-continued

| Processor | First user | Second user |
|---|---|---|
| predetermined keyword level | Suwon "Hyunjin Ryu" → baseball | Gyeonggi-do "The Avengers" → movie |
| Obtaining second keywords | Suwon Baseball | Gyeonggi-do Movie |
| Transfer to at least one server | User ID: USER1 Context: COMMUTE_TO_WORK [Suwon] Contents: baseball | User ID: USER2 Context: COMMUTE_TO_WORK [Gyeonggi-do] Contents: movie |

Table 1 is a table illustrating an operation in which the electronic device 101 according to an embodiment obtains first keywords and second keywords from context information and contents information and transmits the second keywords to the at least one server 260. A first user and a second user may be understood as users of a first electronic device (e.g., the electronic device 101 of FIG. 1) and a second electronic device (e.g., the electronic device 101 of FIG. 1), respectively. It may be understood that Table 1 shows an operation in which each user transmits personal information for contents recommendation to the at least one server 260 by using his/her electronic device. Hereinafter, it may be understood that operations of the first electronic device and the second electronic device are performed by a processor (e.g., 200 of FIG. 2) of each electronic device.

According to an embodiment, the first electronic device and the second electronic device may obtain context information and contents information based on electronic device usage contents of the first user and the second user. For example, the first user may read news article "Hyunjin Ryu 20 wins" by using the first electronic device at an attendance situation. The attendance situation may be understood as context information, and news article "Hyunjin Ryu 20 wins" may be understood as contents information. The second user may watch movie "The Avengers" by using the second electronic device at an attendance situation. The attendance situation may be understood as context information, and movie "The Avengers" may be understood as contents information. With regard to the attendance situation of the first user and the second user, a work place may be understood as Samsung Electronics, located in Yeongtong-gu, Suwon-si, Gyeonggi-do. This may correspond to operation 300 of FIG. 3.

According to an embodiment, the first electronic device and the second electronic device may extract the first keywords based on each user's context information and contents information. For example, the first electronic device may extract "Samsung Electronics" and "Hyunjin Ryu achieved 20 wins" as the first keywords based on the first user's context information and contents information. For example, the second electronic device may extract "Samsung Electronics" and "The Avengers" as the first keywords based on the second user's context information and contents information. This may correspond to operation 310 of FIG. 3.

According to an embodiment, the processor 200 may hierarchically obtain the upper concepts by analyzing categories of the first keywords. For example, the first electronic device and the second electronic device may categorize "Samsung Electronics" as a region name. The first electronic device and the second electronic device may obtain Suwon and Gyeonggi-do as the upper concept of "Samsung Electronics" in a region name category. The first electronic device and the second electronic device may classify "Samsung Electronics" as level 1, may classify "Suwon" as level 2, and may classify "Gyeonggi-do" as level 3. For example, the first electronic device may categorize "Hyunjin Ryu" as sports. The first electronic device may obtain baseball and sports as upper concepts of "Hyunjin Ryu" in a sports category. The first electronic device may classify "Hyunjin Ryu" as level 1, may classify baseball as level 2, and may classify sports as level 3. For example, the second electronic device may categorize "The Avengers" as a movie. The second electronic device may obtain SF movies and movies as upper concepts of "The Avengers" in the movie category. The second electronic device may classify "The Avengers" as level 1, may classify SF movies as level 2, and may classify movies as level 3. This may correspond to operation 310 of FIG. 3. The first electronic device and the second electronic device may store the first keywords as user data in memories (e.g., the memory 210 in FIG. 2) included in the first electronic device and the second electronic device, respectively. The user data may include the user's personal information. The user data may later be used to re-score recommendation contents.

According to an embodiment, the first electronic device and the second electronic device may obtain second keywords by converting the first keywords into upper concepts depending on a predetermined keyword level. The predetermined keyword level of the first user may be different from the predetermined keyword level of the second user. For example, the first user's predetermined keyword level may be used as "level 2". The first electronic device may obtain Suwon and baseball as the second keywords by converting the first keywords (e.g., Samsung Electronics, "Hyunjin Ryu") into upper concepts depending on the predetermined keyword level (e.g., level 2). For example, the second user's predetermined keyword level may be used as "level 3". The second electronic device may obtain Gyeonggi-do and movies as the second keywords by converting first keywords (e.g., Samsung Electronics, "The Avengers") into upper concepts depending on the predetermined keyword level (e.g., level 3). This may correspond to operation 320 of FIG. 3. Because the predetermined keyword level of the second user is higher than that of the first user, it may be understood that the degree of data abstraction for the second user's keywords is higher.

According to an embodiment, the first electronic device and the second electronic device may transmit the second keywords to the at least one server 260 by using the wireless communication circuit 220. For example, as for the first user, the first electronic device may transmit context information (e.g., going to a workplace in Suwon) and contents information (e.g., baseball) together with a user ID to the at least one server 260. For example, as for the second user, the second electronic device may transmit context information (e.g., going to a workplace in Gyeonggi-do) and contents information (e.g., movies) together with a user ID to the at least one server 260. Because the degree of data abstraction of the second user is higher than that of the first user, the exposure degree of personal information of the second user may be lower. On the other hand, according to an embodiment, the second keywords transmitted to the at least one server 260 may be used as input data for training of a recommendation model loaded in the at least one server 260. Accordingly, the second keywords from the first user may be more suitable as training data for personalized recommendations.

Figure 4:
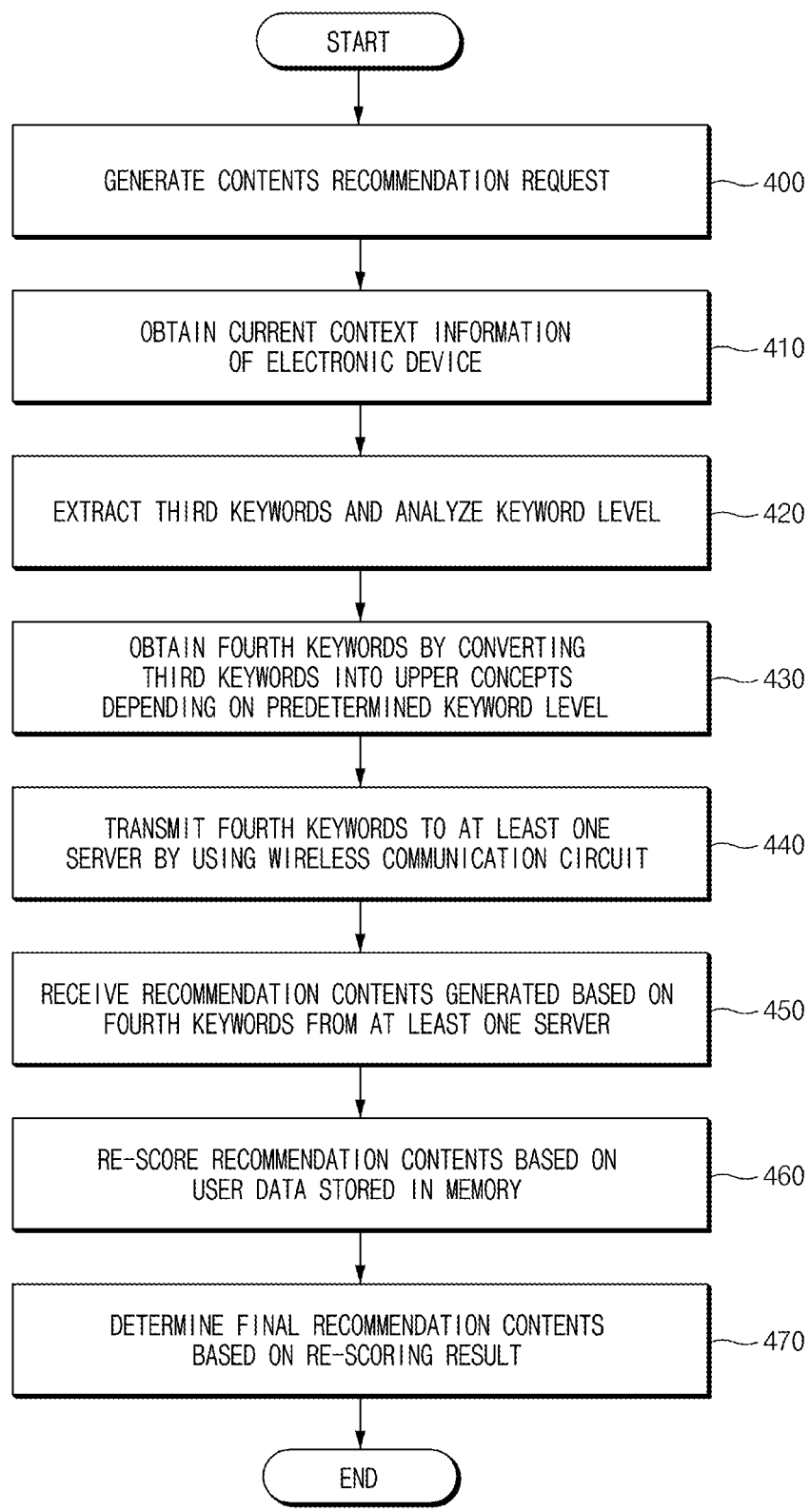
FIG. 4 is a flowchart illustrating a contents recommendation operation performed by an electronic device, according to an example embodiment.

FIG. 4 is a flowchart illustrating a contents recommendation operation performed by an electronic device, according to an embodiment.

Referring to operation 400, a processor (e.g., the processor 200 in FIG. 2) may identify the occurrence of a contents recommendation request. For example, the contents recommendation request may be generated by a user input. For another example, the contents recommendation request may occur automatically while an electronic device (e.g., the electronic device 101 of FIG. 1 or 2) is performing a specified operation (e.g., executing an artificial intelligence assistant application).

In operation 410, the processor 200 may obtain current context information of the electronic device 101.

In operation 420, the processor 200 may extract third keywords based on the current context information and then may analyze a keyword level for the third keywords. For example, the processor 200 may perform operation 420 according to the identical or similar principle to that in operation 310 of FIG. 3. The third keywords may correspond to at least part of the first keywords in FIG. 3. However, it may be understood that the acquisition time of the first keywords is different from the acquisition time of the third keywords. For example, the first keywords in FIG. 3 may be understood as keywords based on context information and contents information at a point in time when operation 300 is performed. The third keywords may be understood as keywords based on context information at a point in time when the recommendation request of operation 400 occurs. In chronological order, operation 400 may be understood to be performed after operation 300.

In operation 430, the processor 200 may obtain fourth keywords by converting the third keywords into upper concepts depending on a predetermined keyword level. The predetermined keyword level may be defined in advance by the user or in any other manner. According to an embodiment, depending on user settings, the predetermined keyword level in FIG. 4 may be different from the predetermined keyword level in FIG. 3.

In operation 440, the processor 200 may transmit fourth keywords to at least one server (e.g., the at least one server 260 in FIG. 2) by using a wireless communication circuit (e.g., the wireless communication circuit 220 in FIG. 2).

In operation 450, the processor 200 may receive recommendation contents generated based on the fourth keywords from the at least one server 260. A method in which the at least one server 260 selects recommendation contents will be described with reference to FIG. 5.

In operation 460, the processor 200 may re-score recommendation contents based on user data stored in a memory (e.g., the memory 210 in FIG. 2). For example, the user data may be used as first keywords obtained in operation 310 of FIG. 3. According to an embodiment, the processor 200 may re-score recommendation contents by using various algorithms. For example, the processor 200 may use a string matching algorithm. The processor 200 may assign similarity depending on the extent to which a string of recommendation contents includes the user data. The processor 200 may re-score recommendation contents based on the similarity. For another example, the processor 200 may use a cosine similarity algorithm. The cosine similarity algorithm may be used as a method of calculating the similarity between two vectors by using the cosine angle between the two vectors. When directions of two vectors are exactly the same as each other and thus an angle formed by the two vectors is 0°, cosine similarity may have a value of 1. When the angle between the two vectors is 90 degrees, cosine similarity may have a value of 0. When the angle formed by the two vectors is 180°, cosine similarity may have a value of −1. The cosine similarity may have a value that is greater than or equal to −1 and less than or equal to 1, it may be understood that the similarity is high as the cosine similarity is close to 1. The processor 200 may obtain cosine similarity between embedding vectors of recommendation contents strings and embedding vectors of user data and then may determine the maximum or a large value of the cosine similarity as final similarity. The processor 200 may re-score recommendation contents based on the final similarity. For another example, the processor 200 may use a Jaccard index algorithm. Jaccard index may be one of methods for measuring similarity between two sets and may be referred to as "Jaccard coefficient" or "Jaccard similarity". Assuming that a set of words extracted from the string of recommendation contents is 'A' and a set of user data is 'B', Jaccard index may be as in Equation 1. According to the Jaccard index algorithm, the processor 200 may obtain a result value of 1 when the two sets 'A' and 'B' are the same as each other, and the processor 200 may obtain a result value of 0 when there is no element in common between the two sets 'A' and 'B'. In other cases, the processor 200 may obtain a value between 0 and 1 as a result value.

$$J(A,B)=(|AiB|)i/(|AjB|) \qquad \text{[Equation 1]}$$

In operation 470, the processor 200 may determine final recommendation contents based on the re-scoring result.

In FIGS. 3 and 4, as the degree of abstraction of second keywords and fourth keywords transmitted by the processor 200 to the at least one server 260 is low, the processor 200 may receive personalized recommendation contents in operation 450 of FIG. 4. Moreover, even when the accuracy (or interest score) of the recommendation contents received in operation 450 of FIG. 4 is low, the processor 200 may improve the accuracy of the content recommendation service through re-scoring in operation 460. The processor 200 may perform the operations of FIGS. 3 and 4, thereby reducing the risk of personal information exposure and providing a highly accurate content recommendation service while resources of the electronic device 101 are efficiently used.

electronic device (e.g., the electronic device 101 of FIG. 1) and a second electronic device (e.g., the electronic device 101 of FIG. 1), respectively. It may be understood that Table 2 shows an operation in which each user re-scores recommendation contents received from the at least one server 260 by using each user's own electronic device. Hereinafter, it may be understood that operations of the first electronic device and the second electronic device are performed by a processor (e.g., the processor 120 of FIG. 1 or the processor 200 of FIG. 2) of each electronic device.

According to an embodiment, the first electronic device and the second electronic device may receive recommendation contents from at least one server (e.g., the at least one server 260 in FIG. 2). It may be understood that the recommendation contents are generated based on the fourth keywords (e.g., the fourth keywords in FIG. 4). The first electronic device and the second electronic device may perform re-scoring by using, for example, a string matching algorithm. For example, when the string of recommendation contents includes one of user data, the processor 200 may assign a weight of 1. Otherwise, the processor 200 may assign a weight of ½. Accordingly, the processor 200 may re-score an interest score.

According to an embodiment, the first electronic device may receive recommendation contents for the first user from the at least one server 260. The at least one server 260 may generate recommendation contents having a high interest score (e.g., an interest score before adjustment) and may transmit the contents to the first electronic device. The interest score before adjustment may be understood as a score given by the recommendation model loaded on the at least one server 260 with respect to recommendation contents. Because the interest score is calculated based on abstracted data (e.g., fourth keywords), there is a need to select recommendation contents more suitable for individual interests through re-scoring of the first electronic device.

According to an embodiment, the first electronic device may re-score recommendation contents for the first user based on user data. The user data may be stored in a memory (e.g., the memory 210 in FIG. 2). For example, with reference to Table 2, the user data of the first user may include

TABLE 2

| | First user (User data: "Hyunjin Ryu", Samsung Electronics) | | | Second user (User data: "The Avengers", Samsung Electronics) | |
|---|---|---|---|---|---|
| | Interest score | | | Interest score | |
| Recommendation contents | Before adjustment | After adjustment | Recommendation contents | Before adjustment | After adjustment |
| [KBO] Highlights of yesterday's game | 0.96 | 0.48 | Gyeonggi-do hosts Art Film Festival | 0.96 | 0.48 |
| Analysis of Cy Young award possibility of Hyunjin Ryu | 0.94 | 0.94 | "The Avengers" sequel news | 0.94 | 0.94 |
| Samsung Electronics drives Suwon Real Estate Market? | 0.90 | 0.90 | [Latest movie] "Forest of piano" | 0.90 | 0.45 |

Table 2 shows re-scoring of recommendation contents of an electronic device according to an embodiment. A first user and a second user may be understood as users of a first "Samsung Electronics" and "Hyunjin Ryu" achieved 20 wins". The first electronic device may obtain an interest score after adjustment by re-scoring the recommendation contents. It may be understood that the interest score after adjustment is obtained by re-scoring the interest score before adjustment for the recommendation contents received by the first electronic device from the at least one server 260 by using various algorithms. The interest score after adjustment may be assigned to be higher as the recommendation contents are similar to the user data. The first electronic device may determine contents, which have the interest score after adjustment higher than a threshold value, as final recommendation contents. For example, the first electronic device may provide a user with only the contents having the interest score after adjustment of 0.5 (threshold) or higher as recommendation contents. For example, high interest scores (0.94, 0.90) from a recommendation model of the at least one server 260 are assigned to "Analysis of Cy Young award possibility of Hyunjin Ryu" and "Samsung Electronics drives Suwon Real Estate Market", and the interest score after adjustment (0.94, 0.90) given through re-scoring is not also less than a threshold value (0.5). Accordingly, "Analysis of Cy Young award possibility of Hyunjin Ryu" and "Samsung Electronics drives Suwon Real Estate Market" may be provided to a user as final recommendation contents. For another example, a high interest score (0.96) from a recommendation model of the at least one server 260 is assigned to "[KBO] Highlights of yesterday's game", and the interest score (0.48) given through re-scoring is not greater than the threshold value (0.5). Accordingly, "[KBO] Highlights of yesterday's game" may be excluded from the final recommendation contents.

According to an embodiment, the second electronic device may receive recommendation contents for the second user from the at least one server 260. The second electronic device may re-score recommendation contents for the second user based on user data. For example, with reference to Table 2, the user data of the second user may include "Samsung Electronics" and "The Avengers". The second electronic device may obtain an interest score after adjustment by re-scoring the recommendation contents. The second electronic device may determine contents, which have the interest score after adjustment higher than a threshold value, as final recommendation contents. For example, the processor 200 may provide a user with only the contents having the interest score after adjustment of 0.5 (threshold) or higher as recommendation contents. For example, a high interest score (0.94) from a recommendation model of the at least one server 260 is assigned to "The Avengers sequel news", and the interest score after adjustment (0.94) given through re-scoring is not also less than a threshold value (0.5). Accordingly, "The Avengers sequel news" may be provided to a user as final recommendation contents. For another example, high interest scores (0.96, 0.90) from a recommendation model of the at least one server 260 are assigned to "Gyeonggi-do hosts Art Film Festival" and "[Latest movie] Forest of piano", and the interest scores (0.48, 0.45) given through re-scoring are not greater than the threshold value (0.5). Accordingly, "Gyeonggi-do hosts Art Film Festival" and "[Latest movie] Forest of piano" may be excluded from final recommendation contents.

Figure 5:
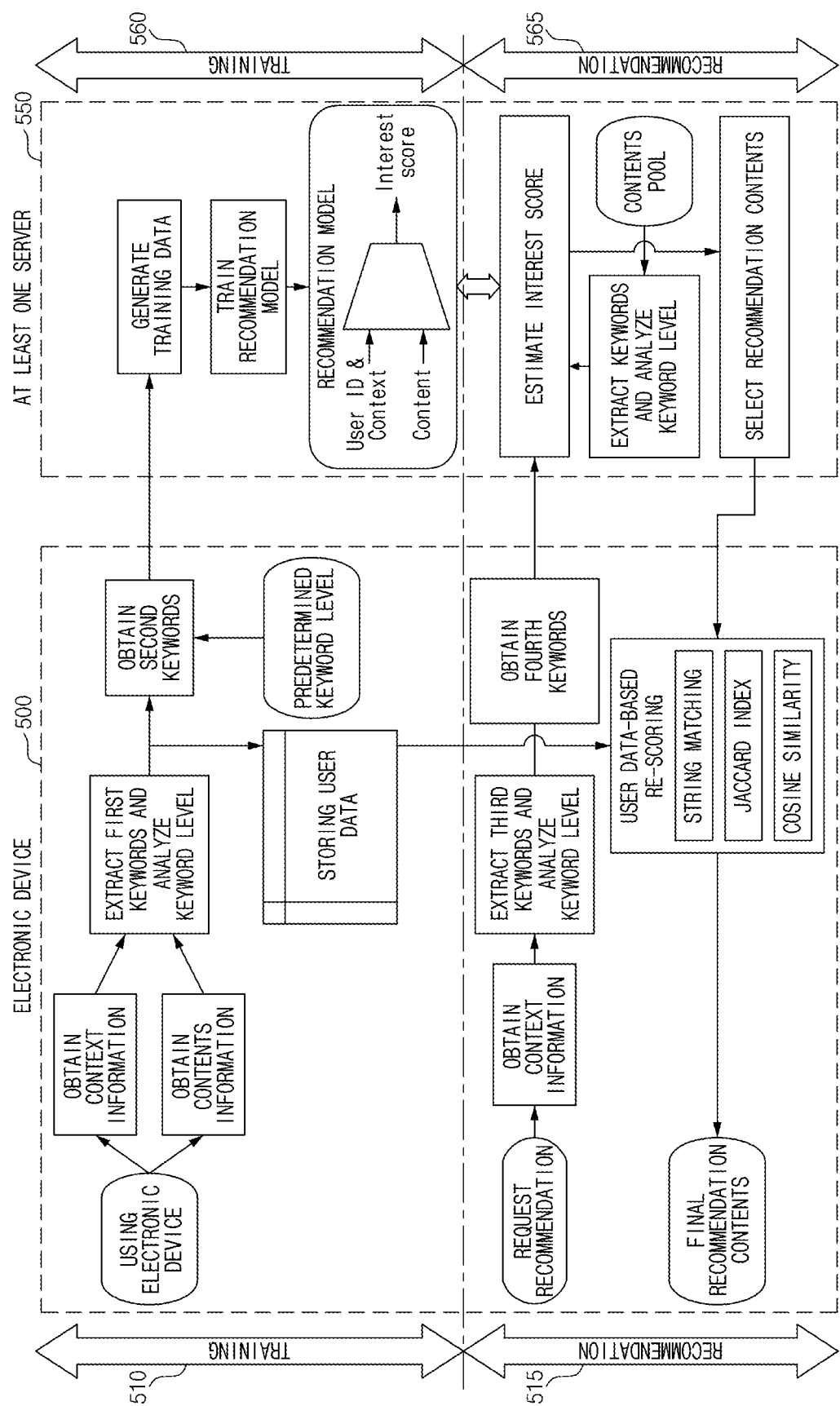
FIG. 5 illustrates content recommendations of an electronic device and at least one server, according to an example embodiment.

FIG. 5 illustrates content recommendations of an electronic device and at least one server, according to an embodiment.

According to an embodiment, an operation of providing a content recommendation service may include a training operation and a recommendation operation. The training operation and the recommendation operation may be performed separately in an electronic device (e.g., the electronic device 101 of FIG. 1) and at least one server (e.g., the at least one server 260 in FIG. 2). Operations of reference number 500 may be understood as operations performed by the electronic device 101. Operations of reference number 550 may be understood as operations performed by the at least one server 260.

Operations related to training performed by the electronic device 101 may be referred to as "reference number 510". Operations related to training performed on the at least one server 260 may be referred to as "reference number 560". Operations related to recommendation performed by the electronic device 101 may be referred to as "reference number 515". Operations related to recommendation performed by the at least one server 260 may be referred to as "reference number 565".

According to an embodiment, a part of the training operation may be performed by the electronic device 101. Referring to reference number 510, when the user is employing the electronic device 101, a processor (e.g., the processor 200 of FIG. 2) may obtain context information and contents information of the electronic device 101. The processor 200 may extract first keywords based on the context information and the contents information and may perform keyword level analysis on the first keywords. Through the keyword level analysis, the processor 200 may obtain upper concepts for the first keywords according to a keyword level. For example, the processor 200 may categorize the first keywords and may obtain the upper concepts for the first keywords from the corresponding category. The processor 200 may classify the obtained upper concepts of the first keywords depending on the keyword level. The processor 200 may store the first keywords as user data in a memory (e.g., the memory 210 in FIG. 2). The user data may be used for re-scoring in the recommendation operation. The processor 200 may obtain second keywords by converting the first keywords into upper concepts depending on a predetermined keyword level. The processor 200 may deliver the second keywords to the at least one server 260 by using a wireless communication circuit (e.g., the wireless communication circuit 220 in FIG. 2). Because the second keywords are the upper concepts of the first keywords, personal information leakage of a lower level may be concerned when the second keywords are transmitted to the at least one server 260. That is, as the predetermined keyword level is higher, personal information may be less included in the second keywords.

According to an embodiment, a part of the training operation may be performed by the at least one server 260. The at least one server 260 may load a recommendation model. Referring to reference number 560, the at least one server 260 may receive the second keywords from the electronic device 101. The at least one server 260 may generate training data based on the second keywords. The at least one server 260 may train a recommendation model by entering the training data into the recommendation model.

TABLE 3

| | | User ID<br>Second keywords |
|---|---|---|
| Input | | |
| Model | User encoder | Receiving user ID and part of second keywords related to context information as inputs to be expressed as real number vectors |
| | Item encoder | Receiving part of second keywords related to contents information as inputs to be expressed as real number vectors |

TABLE 3-continued

| Input | | User ID<br>Second keywords |
|---|---|---|
| | Neural network model | Receiving outputs of a user encoder and an item encoder as inputs and modeling a relationship between two inputs |
| Output | Interest score | Degree of interest, which a user has in specified contents, in a specified context |

Table 3 shows a recommendation model and data related to the recommendation model. According to an embodiment, the recommendation model may receive user ID and second keywords as inputs. The second keywords may include keywords related to context information and keywords related to contents information. The recommendation model may include a user encoder, an item encoder, and/or a neural network model. The user encoder may receive user ID and a part of the second keywords related to the context information as inputs so as to be expressed as real number vectors. The item encoder may receive a part of the second keywords related to the contents information as inputs so as to be expressed as real number vectors. The neural network model may be a model of a neural network architecture obtained by receiving outputs of the user encoder and the item encoder as inputs and modeling a relationship between at least the two inputs. The neural network architecture may be implemented in various architectures such as a deep neural network (DNN) or a bidirectional long short term memory (BLSTM). The neural network architecture may perform a recognition operation and/or a learning process through artificial nodes. In this case, various parameters (e.g., a weight of each layer) of the neural network architecture may be stored in the memory 210 of the electronic device 101. A model of the neural network architecture may be defined as a model that is implemented as hardware, software, or a combination of at least a piece of hardware and at least a piece of software, which performs computational and data processing functions by using a plurality of artificial nodes. The neural network architecture may include a plurality of layers. For example, the neural network architecture may include an input layer, at least one hidden layer, and/or an output layer. Each of the input layer, the hidden layer, and the output layer may include a plurality of nodes. Nodes included in the input layer, the hidden layer, and the output layer may be connected to one another, directly or indirectly, through connection lines each of which has a weight. The input layer may receive input data and may deliver the input data to the hidden layer. The output layer may generate output data based on signals received from nodes of the hidden layer. The electronic device 101 may convert the input data into a value, which is easily predicted, by using at least one or more hidden layers connected between at least the input layer and the output layer. The hidden layer may be or include a layer corresponding to a fully-connected layer or a convolution filter in a convolutional neural network (CNN), but is not limited thereto. For example, the hidden layer may be or include various types of filters or layers that are classified based on a specified function or feature. The recommendation model may output an interest score based on the modeling of the neural network model. The interest score may quantify the degree of interest, which the user has in the specified contents, in a specified context. The at least one server 260 may improve reliability of an output value by repeatedly performing training of a recommendation model.

According to an embodiment, a part of the recommendation operation may be performed by the electronic device 101. The processor 200 may identify the occurrence of a contents recommendation request. The contents recommendation request may be triggered by a user input or may occur automatically while the electronic device 101 is executing a specified application (e.g., an artificial intelligence assistant application). The processor 200 may obtain context information. The processor 200 may extract third keywords based on the context information and may analyze a keyword level based on the third keywords. The processor 200 may obtain fourth keywords by converting the third keywords into upper concepts depending on a predetermined keyword level. The processor 200 may transmit the fourth keywords to the at least one server 260 by using the wireless communication circuit 220. The at least one server 260 may generate (select) recommendation contents based on the received fourth keywords, and the processor 200 may receive the recommendation contents from the at least one server 260 by using the wireless communication circuit 220. The processor 200 may also receive an interest score of each of recommendation contents from the at least one server 260. The processor 200 may re-score an interest score of recommendation contents based on user data. For example, the processor 200 may use at least one of a string matching algorithm, a Jaccard index algorithm, and a cosine similarity algorithm as a re-scoring method. The processor 200 may determine final recommendation contents based on the re-scoring result and may provide the final recommendation contents to the user. The processor 200 may recommend more personalized contents by re-scoring the received recommendation contents based on user data.

According to an embodiment, a part of the recommendation operation may be performed by the at least one server 260. The at least one server 260 may receive the fourth keywords from the electronic device 101. The at least one server 260 may fetch contents from a contents pool for contents recommendation. For example, the contents pool may be provided by a third provider. The at least one server 260 may extract keywords of the contents and may analyze a keyword level. The at least one server 260 may calculate an interest score for each of the contents for the context of the electronic device 101 by entering the fourth keywords and contents obtained from the contents pool into a recommendation model. As a result of the calculation, the at least one server 260 may select contents having a high interest score as recommendation contents. For example, the at least one server 260 may set a threshold value and may select contents having an interest score greater than or equal to a threshold value as the recommendation contents. The at least one server 260 may deliver the recommendation contents to the electronic device 101. After receiving the recommendation contents, the electronic device 101 may perform re-scoring to determine the final recommendation contents.

According to an embodiment, the electronic device 101 may the wireless communication circuit 220, the memory 210, and the processor 200. The memory 210 may store instructions that, when executed, cause the processor 200 to obtain context information related to a state of the electronic device and contents information being provided by the electronic device, to extract first keywords based on the context information and the contents information, to analyze a keyword level for the first keywords, to obtain second keywords by converting the first keywords into upper concepts depending on a predetermined keyword level, and to transmit the second keywords to the at least one server 260 by using the wireless communication circuit 220.

According to an embodiment, the memory 210 may store instructions that, when executed, cause the processor 200 to transmit user identification information together with second keywords to the at least one server 260 by using the wireless communication circuit 220.

According to an embodiment, the instructions may cause the processor 200 to obtain current context information of the electronic device 101 when a contents recommendation request occurs, to extract third keywords based on the current context information, to analyze a keyword level for the third keywords, to obtain fourth keywords by converting the second keywords into upper concepts depending on a predetermined keyword level, to transmit the fourth keywords to the at least one server 260 by using the wireless communication circuit 220, to receive recommendation contents, which are generated based on the fourth keywords, from the at least one server 260 by using the wireless communication circuit 220, to re-score the recommendation contents based on user data stored in the memory 210, and to determine final recommendation contents based on the re-scoring result. For example, the user data may include the context information and the contents information.

According to an embodiment, the instructions may cause the processor 200 to perform the re-scoring based on at least one of a string matching algorithm, a Jaccard index algorithm, or a cosine similarity algorithm. For example, the contents information may include text-based information. For example, the context information may include location information of the electronic device.

According to an embodiment, the electronic device 101 may further include a display (e.g., display module 160 in FIG. 1, which includes a display). The memory 210 may store instructions that, when executed, cause the processor 200 to provide a user interface through the display 160, and to determine the predetermined keyword level based on a user input to the user interface. "Based on" as used herein covers based at least on.

Figure 6:
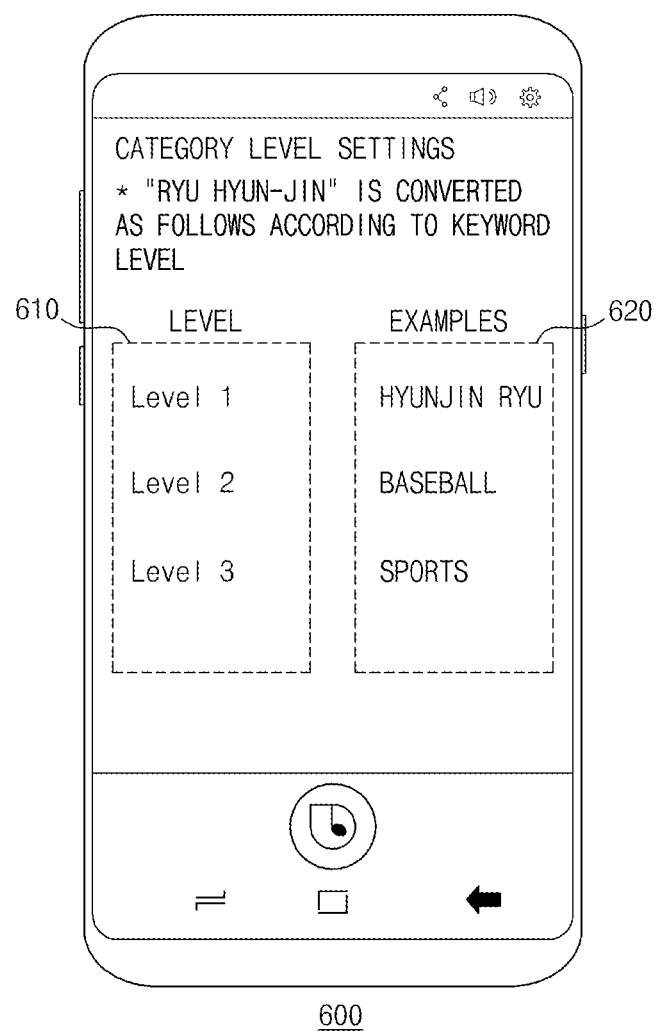
FIG. 6 illustrates a user interface for determining a predetermined keyword level of an electronic device, according to an example embodiment.

FIG. 6 illustrates a user interface for determining a predetermined keyword level of an electronic device, according to an embodiment.

According to an embodiment, to determine a predetermined keyword level, a processor (e.g., the processor 200 in FIG. 2) may display a user interface such as screen 600 on a display (e.g., the display module 160 in FIG. 1). Screen 600 may include a visual object 610 for a keyword level and a visual object 620 illustrating an example according to each keyword level. For example, when a keyword corresponding to level 1 is "Hyunjin Ryu", an example, in which, as upper concepts of "Hyunjin Ryu", baseball corresponds to level 2 and sports corresponds to level 3, may be displayed in the visual object 620.

According to an embodiment, the processor 200 may determine a predetermined keyword level by receiving a user input to the visual object 610. The user input may be referred to as, for example, a "touch input" to the visual object 610. For example, when the processor 200 receives a user input to level 2 in the visual object 610, the processor 200 may determine level 2 as the predetermined keyword level. In this case, in operation 320 of FIG. 3, the processor 200 may obtain second keywords (e.g., baseball) by converting first keywords (e.g., "Hyunjin Ryu") into level 2.

Figure 7:
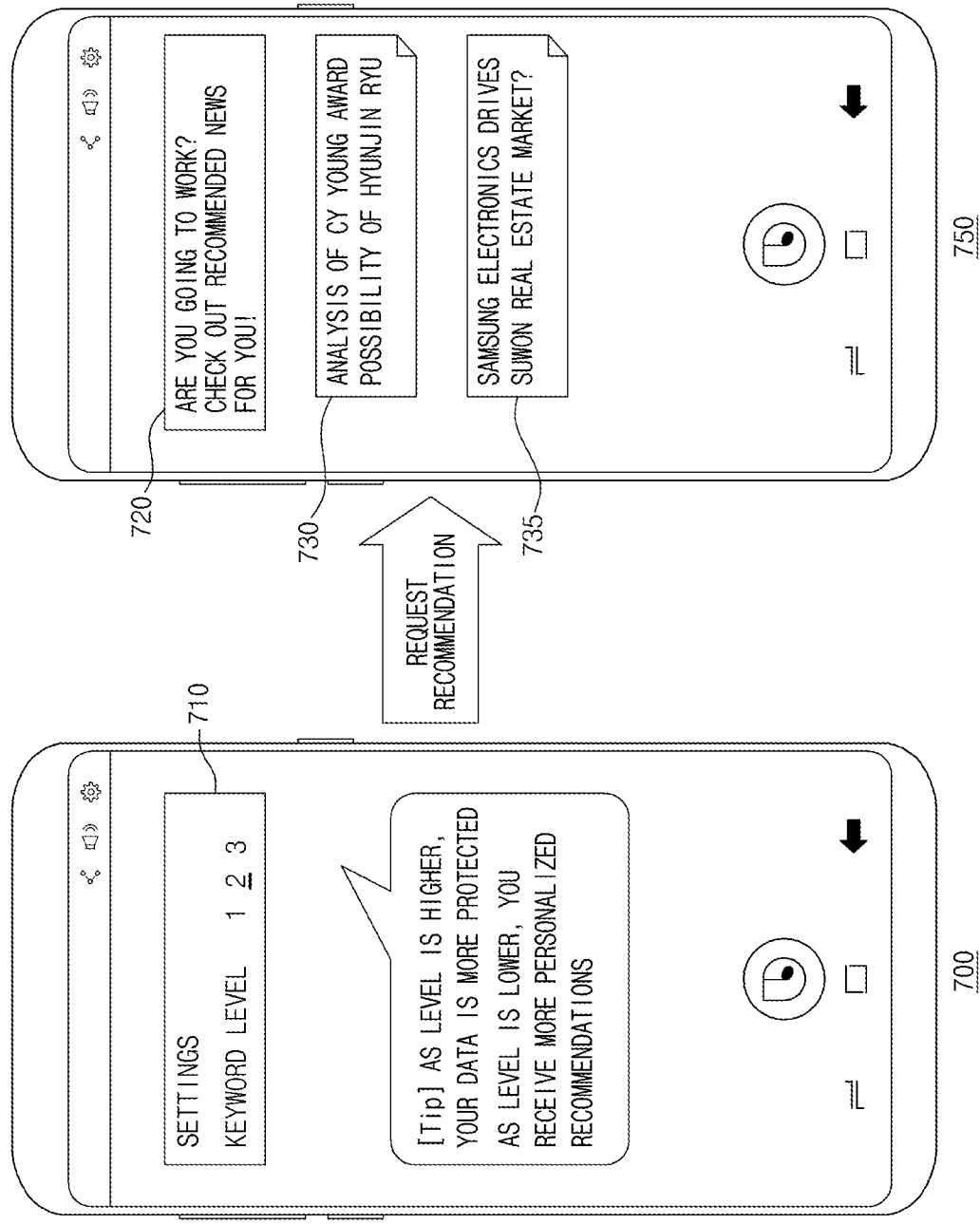
FIG. 7 illustrates contents recommendation, according to an example embodiment.

FIG. 7 illustrates contents recommendation, according to an embodiment.

On screen 700, a processor (e.g., the processor 200 in FIG. 2) may display information about a predetermined keyword level as a visual object 710 through a display (e.g., display module 160 in FIG. 1). Referring to the visual object 710, the predetermined keyword level may be understood as level 2. When the predetermined keyword level is set to be high, it may be understood that a content recommendation service according to an embodiment may more strongly protect personal information. On the other hand, when the predetermined keyword level is set to be low, it may be understood that the content recommendation service according to an embodiment may recommend more personalized contents. The processor 200 may also display such information on screen 700.

On screen 750, the processor 200 may provide recommendation contents through a display. The recommendation contents on screen 750 may be referred to as "final recommendation contents" determined in operation 470 of FIG. 4. Referring to a visual object 720, the processor 200 may display context information (e.g., going to work) of an electronic device (e.g., the electronic device 101 of FIG. 1) together with a contents recommendation guide. Referring to visual objects 730 and 735, the processor 200 may visually provide recommendation contents through the display. At this time, the provided recommendation contents may include text-based contents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
    a wireless communication circuit;
    at least one sensor;
    a memory; and
    at least one processor comprising processing circuitry, wherein the at least one processor, individually or collectively, is configured to:
    obtain, using the at least one sensor, sensor data;
    obtain context information related to at least one of location information of the electronic device or activity of a user based on the sensor data, and contents information indicating contents being provided by the electronic device to the user;
    extract first keywords from the context information and the contents information;
    determine a keyword level for the first keywords from among a plurality of hierarchical keyword levels, wherein each the plurality of hierarchical keyword levels corresponds to a different degree of data abstraction;
    obtain second keywords at least by converting the first keywords into upper concepts corresponding to a predetermined keyword level selected among the plurality of hierarchical keyword levels, wherein the predetermined keyword level corresponds to a higher degree of data abstraction than the keyword level for the first keywords; and
    control to transmit the second keywords to at least one server via the wireless communication circuit for training of a recommendation model loaded in the at least one server.

2. The electronic device of claim 1, wherein the at least one processor, individually or collectively, is configured to:

in response to a contents recommendation request, obtain current context information of the electronic device;
extract third keywords from the current context information;
determine a keyword level for the third keywords from among the plurality of hierarchical keyword levels;
obtain fourth keywords at least by converting the second keywords into upper concepts corresponding to the predetermined keyword level;
control to transmit the fourth keywords to the at least one server via the wireless communication circuit;
receive recommendation contents, which are based on the fourth keywords, from the at least one server;
re-score the recommendation contents based on user data stored in the memory; and
determine final recommendation contents based on the re-scoring result.

3. The electronic device of claim 2, wherein the at least one processor, individually or collectively, is configured to:
perform the re-score based on at least one of: a string matching algorithm, a Jaccard index algorithm, or a cosine similarity algorithm.

4. The electronic device of claim 2, wherein the user data includes the context information and the contents information.

5. The electronic device of claim 1, wherein the contents information includes text-based information.

6. The electronic device of claim 1, wherein the context information includes location information of the electronic device.

7. The electronic device of claim 1, wherein the at least one processor, individually or collectively, is configured to:
control to transmit user identification information together with the second keywords to the at least one server via the wireless communication circuit.

8. The electronic device of claim 1, further comprising:
a display,
wherein the at least one processor, individually or collectively, is configured to:
provide a user interface including a first visual object indicating the plurality of hierarchical keyword levels, and a second visual object illustrating a plurality of examples corresponding to each of the plurality of hierarchical keyword levels via the display;
receive a user input for selecting a keyword level among the plurality of hierarchical keyword levels included in the first visual object; and
determine the keyword level selected based on the user input as the predetermined keyword level.

9. An operating method of an electronic device, the method comprising:
obtaining, using at least one sensor of the electronic device, sensor data;
obtaining context information related to at least one of location information of the electronic device or activity of a user based on the sensor data, and contents information indicating contents being provided by the electronic device to the user;
extracting first keywords from the context information and the contents information;
determine a keyword level for the first keywords from among a plurality of hierarchical keyword levels, wherein each the plurality of hierarchical keyword levels corresponds to a different degree of data abstraction;
obtaining second keywords at least by converting the first keywords into upper concepts corresponding to a predetermined keyword level selected among the plurality of hierarchical keyword levels, wherein the predetermined keyword level corresponds to a higher degree of data abstraction than the keyword level for the first keywords; and
transmitting the second keywords to at least one server for training of a recommendation model loaded in the at least one server.

10. The method of claim 9, further comprising:
when a contents recommendation request occurs, obtaining current context information of the electronic device;
extracting third keywords from the current context information;
determine a keyword level for the third keywords from among the plurality of hierarchical keyword levels;
obtaining fourth keywords at least by converting the second keywords into upper concepts corresponding to the predetermined keyword level;
transmitting the fourth keywords to the at least one server;
receiving recommendation contents, generated based on the fourth keywords, from the at least one server;
re-scoring the recommendation contents based on user data stored in a memory; and
determining final recommendation contents based on the re-scoring result.

11. The method of claim 10, wherein the re-scoring of the recommendation contents further includes:
performing the re-scoring based on at least one of: a string matching algorithm, a Jaccard index algorithm, or a cosine similarity algorithm.

12. The method of claim 10, wherein the user data includes the context information and the contents information.

13. The method of claim 9, wherein the contents information includes text-based information.

14. The method of claim 9, wherein the context information includes location information of the electronic device.

15. The method of claim 9, further comprising:
transmitting user identification information together with the second keywords to the at least one server.

16. The method of claim 9, further comprising:
providing a user interface including a first visual object indicating the plurality of hierarchical keyword levels, and a second visual object illustrating a plurality of examples corresponding to each of the plurality of hierarchical keyword levels via a display;
receiving a user input for selecting a keyword level among the plurality of hierarchical keyword levels included in the first visual object; and
determining the keyword level selected based on the user input as the predetermined keyword level.

17. A non-transitory computer-readable recording medium storing at least one or more instructions, when executed by at least one processor of an electronic device, may cause the at least one processor to:
obtain, using at least one sensor of the electronic device, sensor data;
obtain context information related to a current situation at least one of location information of the electronic device or activity of a user based on the sensor data, and contents information indicating contents being provided by the electronic device to the user;
extract first keywords from the context information and the contents information;
determine a keyword level for the first keywords from among a plurality of hierarchical keyword levels, wherein each the plurality of hierarchical keyword levels corresponds to a different degree of data abstraction;

obtain second keywords at least by converting the first keywords into upper concepts corresponding to a predetermined keyword level selected among the plurality of hierarchical keyword levels, wherein the predetermined keyword level corresponds to a higher degree of data abstraction than the keyword level for the first keywords; and transmit the second keywords to at least one server for training of a recommendation model loaded in the at least one server.

18. The non-transitory computer-readable recording medium of claim 17, wherein the instructions, cause the at least one processor to:

in response to a contents recommendation request, obtain current context information of the electronic device;

extract third keywords from the current context information;

a keyword level for the third keywords from among the plurality of hierarchical keyword levels;

obtain fourth keywords at least by converting the second keywords into upper concepts corresponding to the predetermined keyword level;

control to transmit the fourth keywords to the at least one server;

receive recommendation contents, which are based on the fourth keywords, from the at least one server;

re-score the recommendation contents based on user data stored in a memory; and determine final recommendation contents based on the re-scoring result.

19. The non-transitory computer-readable recording medium of claim 18, wherein the instructions, cause the at least one processor to:

perform the re-score based on at least one of: a string matching algorithm, a Jaccard index algorithm, or a cosine similarity algorithm.

20. The non-transitory computer-readable recording medium of claim 19, wherein the user data includes the context information and the contents information.

* * * * *